(12) United States Patent
Lee et al.

(10) Patent No.: US 11,514,723 B2
(45) Date of Patent: Nov. 29, 2022

(54) METHOD AND APPARATUS FOR DETERMINING LIVENESS

(71) Applicant: SAMSUNG ELECTRONICS CO., LTD., Suwon-si (KR)

(72) Inventors: Younkyu Lee, Seoul (KR); Jingu Heo, Yongin-si (KR); Joohyeon Kim, Seoul (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 54 days.

(21) Appl. No.: 16/862,971

(22) Filed: Apr. 30, 2020

(65) Prior Publication Data

US 2021/0064899 A1 Mar. 4, 2021

(30) Foreign Application Priority Data

Aug. 26, 2019 (KR) .................. 10-2019-0104599

(51) Int. Cl.
*G06V 40/40* (2022.01)
*G06V 10/56* (2022.01)
(Continued)

(52) U.S. Cl.
CPC .............. *G06V 40/45* (2022.01); *G06V 10/56* (2022.01); *G06V 10/758* (2022.01); *G06V 40/1318* (2022.01); *G06V 40/1347* (2022.01)

(58) Field of Classification Search
CPC .............. G06K 9/00906; G06K 9/4652; G06K 9/0004; G06K 9/00067; G06K 9/6212;
(Continued)

(56) References Cited

U.S. PATENT DOCUMENTS

2003/0044051 A1* 3/2003 Fujieda .................. G06V 40/40
382/124
2010/0008552 A1 1/2010 Shin et al.
(Continued)

FOREIGN PATENT DOCUMENTS

CZ 304801 B6 * 10/2014
KR 10-2010-0007317 A 1/2010
(Continued)

OTHER PUBLICATIONS

Y. Baek, "The fake fingerprint detection system using a novel color distribution," 2016 International Conference on Information and Communication Technology Convergence (ICTC), 2016, pp. 1111-1113, doi: 10.1109/ICTC.2016.7763381. (Year: 2016).*

*Primary Examiner* — Edward F Urban
*Assistant Examiner* — Wassim Mahrouka
(74) *Attorney, Agent, or Firm* — Sughrue Mion, PLLC

(57) ABSTRACT

A liveness determining method and apparatus are provided. The liveness determining apparatus includes an optical sensor including at least one optical source; a memory configured to store registered color information; and at least one processor configured to: obtain, from the optical sensor, an input fingerprint image of an object corresponding to the at least one optical source, obtain input color information from the input fingerprint image, compare the input color information and the registered color information, and determine liveness of the object based on a result of the comparing.

14 Claims, 6 Drawing Sheets

(51) Int. Cl.
*G06V 10/75* (2022.01)
*G06V 40/13* (2022.01)
*G06V 40/12* (2022.01)

(58) Field of Classification Search
CPC .......... G06K 9/00114; G06K 9/00013; G06K 9/00087; G06F 21/32; G06F 21/45
See application file for complete search history.

(56) References Cited

U.S. PATENT DOCUMENTS

| | | |
|---|---|---|
| 2015/0294132 A1 | 10/2015 | Rowe |
| 2018/0357461 A1 | 12/2018 | Beaudet |
| 2019/0266376 A1* | 8/2019 | He .................. G02F 1/13338 |

FOREIGN PATENT DOCUMENTS

| | | | | |
|---|---|---|---|---|
| KR | 10-2015-0029129 A | | 3/2015 | |
| KR | 10-2017-0033058 A | | 3/2017 | |
| KR | 20170033058 A | * | 3/2017 | |
| KR | 10-2017-0116530 A | | 10/2017 | |
| KR | 10-2019-0018349 A | | 2/2019 | |
| KR | 10-2019-0049148 A | | 5/2019 | |
| WO | WO-2017179751 A1 | * | 10/2017 | ............... G06K 9/62 |
| WO | WO-2020124511 A1 | * | 6/2020 | ............... G06K 9/00 |

\* cited by examiner

METHOD AND APPARATUS FOR DETERMINING LIVENESS

CROSS-REFERENCE TO RELATED APPLICATION

This application claims priority from Korean Patent Application No. 10-2019-0104599 filed on Aug. 26, 2019, in the Korean Intellectual Property Office, the disclosure of which is incorporated herein by reference in its entirety.

BACKGROUND

1. Field

Methods and apparatuses consistent with example embodiments relate to technology for determining liveness in user verification.

2. Description of Related Art

In a user verification system, a computing apparatus determines whether to allow a user to access the computing apparatus based on verification information provided by the user. The verification information may include, for example, either one or both of a password input by the user and biometric information of the user. The biometric information may include, for example, information associated with any one or any combination of any two or more of a fingerprint, an iris, and a face of the user.

Recently, fingerprint anti-spoofing technology has been gaining attention as a security method for a user verification system to combat a fingerprint spoofing attack, which is a type of spoofing attack using a representation of a user's fingerprint that intends to spoof or trick an underlying device or system to believe that an authorized user or person is attempting access or use of the device or system. The fingerprint anti-spoofing technology is intended to identify such a fingerprint spoofing attack, using, for example, biometric mimicking, during a fingerprint verification process. The fingerprint anti-spoofing technology is used to determine whether a fingerprint of a user input to such a device or system is a fake fingerprint or a live fingerprint. The fake fingerprint may be formed of various materials. The fingerprint anti-spoofing technology may include extracting features from an input image and determining whether an input fingerprint in the input image is fake or genuine based on the extracted features.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of example embodiment, there is provided a liveness determining method including: obtaining, by an optical sensor, an input fingerprint image of an object corresponding to at least one optical source of the optical sensor; obtaining, by a processor, input color information from the input fingerprint image; comparing, by the processor, the input color information and registered color information; and determining, by the processor, liveness of the object based on a result of the comparing.

The obtaining of the input fingerprint image may include obtaining a plurality of input fingerprint images at a preset frame rate for a preset time period, for each optical source of a plurality of optical sources having different frequencies.

The comparing may include comparing an input intensity obtained from the input fingerprint image and a registered intensity from the registered color information, for each optical source of a plurality of optical sources having different frequencies.

The comparing may include: (i) determining whether a difference between the input intensity and the registered intensity for a plurality of pixels is less than a first threshold value; or (ii) determining whether an average of the difference between the input intensity and the registered intensity for the plurality of pixels is less than a second threshold value.

The comparing may include comparing a change in an input intensity of a plurality of input fingerprint images obtained for a preset time period and a change in a registered intensity of a plurality of registered fingerprint images, for each optical source of a plurality of optical sources having different frequencies.

The comparing may include: (i) determining whether a difference between the change in the input intensity and the change in the registered intensity is less than a first threshold value; or (ii) determining whether a time average of the difference between the change in the input intensity and the change in the registered intensity is less than a second threshold value.

The at least one optical source has at least one of a frequency of red (R), a frequency of green (G), and a frequency of blue (B).

The obtaining of the input fingerprint image may include obtaining an input fingerprint image corresponding to an R optical source, an input fingerprint image corresponding to a G optical source, and an input fingerprint image corresponding to a B optical source. The obtaining of the input color information may include: obtaining input color information of the R optical source from the input fingerprint image corresponding to the R optical source; obtaining input color information of the G optical source from the input fingerprint image corresponding to the G optical source; and obtaining input color information of the B optical source from the input fingerprint image corresponding to the B optical source. The comparing may include: comparing the input color information of the R optical source and registered color information of the R optical source; comparing the input color information of the G optical source and registered color information of the G optical source; and comparing the input color information of the B optical source and registered color information of the B optical source. The determining may include determining the liveness of the object based on results of the comparing.

According to an aspect of another example embodiment, there is provided a non-transitory computer-readable storage medium storing instructions that are executable by a processor to perform the liveness determining method.

According to an aspect of another example embodiment, there is provided a liveness determining apparatus including: an optical sensor including at least one optical source; a memory configured to store registered color information; and at least one processor configured to: obtain, from the optical sensor, an input fingerprint image of an object corresponding to the at least one optical source, obtain input color information from the input fingerprint image, compare the input color information and the registered color information, and determine liveness of the object based on a result of the comparing.

The at least one optical source may include a plurality of optical sources having different frequencies, and the processor may be further configured to obtain a plurality of input fingerprint images at a preset frame rate for a preset time period, for each optical source of the plurality of optical sources having different frequencies.

The at least one optical source may include a plurality of optical sources having different frequencies, and the processor may be further configured to compare an input intensity obtained from the input fingerprint image and a registered intensity, for each optical source of a plurality of optical sources having different frequencies.

The at least one optical source may include a plurality of optical sources having different frequencies, and the processor may be further configured to compare a change in an input intensity of a plurality of input fingerprint images obtained for a preset time period and a change in a registered intensity of a plurality of registered fingerprint images, for each optical source of a plurality of optical sources having different frequencies.

The processor may be further configured to: determine whether a difference between the input intensity and the registered intensity for a plurality of pixels is less than a first threshold value, and determine whether an average of the difference between the input intensity and the registered intensity for the plurality of pixels is less than a second threshold value.

The processor may be further configured to: determine whether a difference between the change in the input intensity and the change in the registered intensity is less than a third threshold value, and determine whether a time average of the difference between the change in the input intensity and the change in the registered intensity is less than a fourth threshold value.

The at least one optical source may have at least one of a frequency of red (R), a frequency of green (G), and a frequency of blue (B).

The at least one optical source may include an R optical source, a G optical source, and a B optical source, and the processor may be further configured to: obtain an input fingerprint image corresponding to the R optical source, an input fingerprint image corresponding to the G optical source, and an input fingerprint image corresponding to the B optical source, obtain input color information of the R optical source from the input fingerprint image corresponding to the R optical source, obtain input color information of the G optical source from the input fingerprint image corresponding to the G optical source, obtain input color information of the B optical source from the input fingerprint image corresponding to the B optical source, compare the input color information of the R optical source and registered color information of the R optical source, compare the input color information of the G optical source and registered color information of the G optical source, compare the input color information of the B optical source and registered color information of the B optical source, and determine the liveness of the object based on results of the comparing.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1:
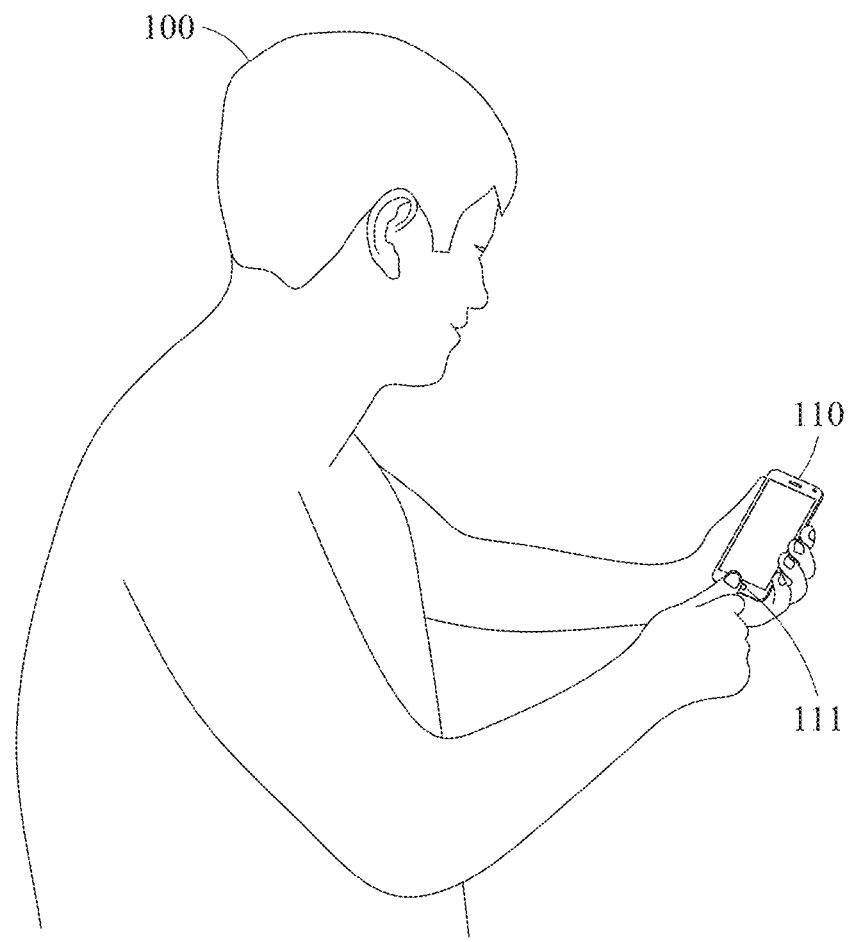
FIG. 1 is a diagram illustrating an example of a situation in which a liveness determining apparatus determines liveness of an object in an input fingerprint image according to an example embodiment.

Reference will now be made in detail to example embodiments, examples of which are illustrated in the accompanying drawings, wherein like reference numerals refer to the like elements throughout.

The following structural or functional descriptions are exemplary to merely describe the example embodiments, and the scope of the example embodiments is not limited to the descriptions provided in the disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of the example embodiments.

FIG. 1 is a diagram illustrating an example of a situation in which a liveness determining apparatus determines liveness of an object in an input fingerprint image according to an example embodiment.

Referring to FIG. 1, aliveness determining apparatus 110 may verify a user 100 based on an input fingerprint image of the user 100 obtained by an optical sensor 111. The liveness determining apparatus 110 may determine liveness of an object in the input fingerprint image of the user 100, and verify the user 100 based on a result of the determination. The liveness determining apparatus 110 may determine the liveness of the object in the input fingerprint image using at least one frequency optical source. The liveness determining apparatus 110 may determine the liveness of the object in the input fingerprint image based on at least one set of color information.

When a finger of a user is pressed against the optical sensor 111, an intensity of an input fingerprint image of the user may change over time due to a change in blood flow. However, when a fake object or a fake image is input, there is no change in blood flow in the fake object or the fake image, and thus an intensity of the input fake image may not change over time. Based on this, the liveness determining apparatus 110 according to an example embodiment may determine liveness of an object in an input fingerprint image more effectively by comparing input color information of multiple frames and registered color information, for each frequency optical source.

A fingerprint may be one of parameters most generally used for biometric verification or authentication. It may be used in a wide range of applications, for example, from user verification of a mobile device to identification of a suspect in a crime scene. In addition, as the use of online or internet banking in a mobile environment has been increasing recently, a user verification method using a fingerprint has been more widely used. In general, such biometric verification may include a liveness test operation and a verification operation.

The liveness test operation is to determine whether a test object, that is a target for a liveness test, is live or not. For example, the liveness test may be performed to determine whether a fingerprint in an image captured by a camera is a fake fingerprint or a live fingerprint. The liveness test may be used to verify liveness of a verification target that is the same as the test object for user verification performed for user log-in, payment services, access control, and other operations requiring user verification. For example, in a user verification system, the liveness test may be used to distinguish between a live object, for example, a live human being, and a lifeless object, for example, a photograph, an image, a replica, or other representations of a user used as a means of a fingerprint spoofing attack.

An invalid user may use a spoofing technique to obtain a false acceptance in such a user verification system. For example, the invalid user may present, to a camera, a color image, a video, a mask, a replica, or other representations in which a fingerprint of a valid user appears to obtain a false acceptance in fingerprint verification. The liveness test may filter out or block such an attempt for the fingerprint verification, for example, a fingerprint spoofing attack performed using a substitute for a fingerprint of the valid user, for example, an image, a video, a mask, a replica, or other representations of the fingerprint of the valid user. In response to a determination that the verification target is a lifeless object as a result of the liveness test, the user verification may not be performed, or the user verification may be determined to fail irrespective of a result of the user verification.

A fake fingerprint may include various types of fake fingerprints formed of various materials and textures using, for example, paper, silicone, gelatin, wood glue, and other available means. An elaborately formed fake fingerprint may look extremely similar to an actual live fingerprint when it is captured as an image.

A fingerprint acquiring sensor may be broadly classified into three types of sensors—a capacitive sensor, an ultrasonic sensor, and an optical sensor—based on how such sensors obtain a fingerprint image. Each of these sensors is used in various ways based on a characteristic and a unit price of a mobile device to which it is applied. The sensors obtain an image in different ways, and thus they have a difference in performance according to a material with which a fake fingerprint is formed. For example, in a case of a fingerprint that is printed on a sheet of paper by a general type of ink, the capacitive sensor and the ultrasonic sensor may not obtain an image therefrom because the fingerprint printed on paper is not electrically conductive and does not include curved portions. However, in such a case, the optical sensor may obtain an image that looks similar to an actual fingerprint image.

An existing fingerprint anti-spoofing method may extract various features from a black-and-white image obtained by a sensor, learn the extracted features, and determine whether an input fingerprint is fake or live. However, the existing method may not be effective for a new material or texture used to form a fake fingerprint, and may depend on training data. In addition, the existing method may be likely to falsely determine an actual live fingerprint to be an elaborately formed fake fingerprint that may not be easily identified from a black-and-white image. For example, when a fake fingerprint image that is formed of a new material and has not been learned yet is input, such an existing image training-based method may not accurately determine whether the input image is fake or genuine. As a result, the existing method may falsely determine a fake fingerprint image that is not easily distinguishable from the actual live fingerprint image is an actual live fingerprint image.

According to an example embodiment, the liveness determining apparatus 110 may determine liveness of an object in an input fingerprint image, using at least one frequency optical source, through the optical sensor. Thus, the liveness determining apparatus 110 may effectively respond to a fake fingerprint formed of a new material without expanding a training image database (DB) or applying a new feature extraction method. The liveness determining apparatus 110 may obtain more information using optical sources of various colors, compared to using a black-and-white image, and thus increase accuracy. The liveness determining apparatus 110 may increase the accuracy, and may thus need only a reduced number of other types of sensors to measure a heart rate, a blood flow rate, and the like. In addition, the liveness determining apparatus 110 may be advantageous in terms of portability of a mobile device, a unit price of a sensor, and a speed of user verification.

The optical sensor may include, for example, a charge-coupled device (CCD) camera-type sensor and a CCD scanner-type sensor. In a case of the CCD camera-type sensor, a CCD camera of which a focal point is set on an outer surface of a glass plate may capture a black-and-white image when a finger is put on the glass plate. In such a case, a convex portion of a fingerprint is attached to the glass and only the fingerprint is in focus, and a concave portion of the fingerprint may be captured relatively blurry. In a case of the CCD scanner-type sensor, a small scanner may scan a fingerprint instead of a camera.

The color information used herein may include an intensity or brightness. The color information may include information associated with an intensity of a certain channel based on one among various color models. The color models may include, for example, a red, green, blue (RGB) color model, a cyan, magenta, yellow (CMY) color model, a hue, saturation, intensity (HSI) model, a YCbCr color model, a YUV color model, a UVW color model, and the like. Hereinafter, a liveness determining method will be described based on an RGB color model.

The liveness determining apparatus 110 may be provided in or embodied by various apparatuses or devices. For example, the liveness determining apparatus 110 may be provided in or embodied by, for example, a smartphone, a tablet personal computer (PC), a laptop computer, a desktop computer, a wearable device, and various types of Internet of things (IoT) devices. However, the apparatus or devices described in the foregoing may be provided merely as an example, and thus examples are not limited thereto.

Figure 2:
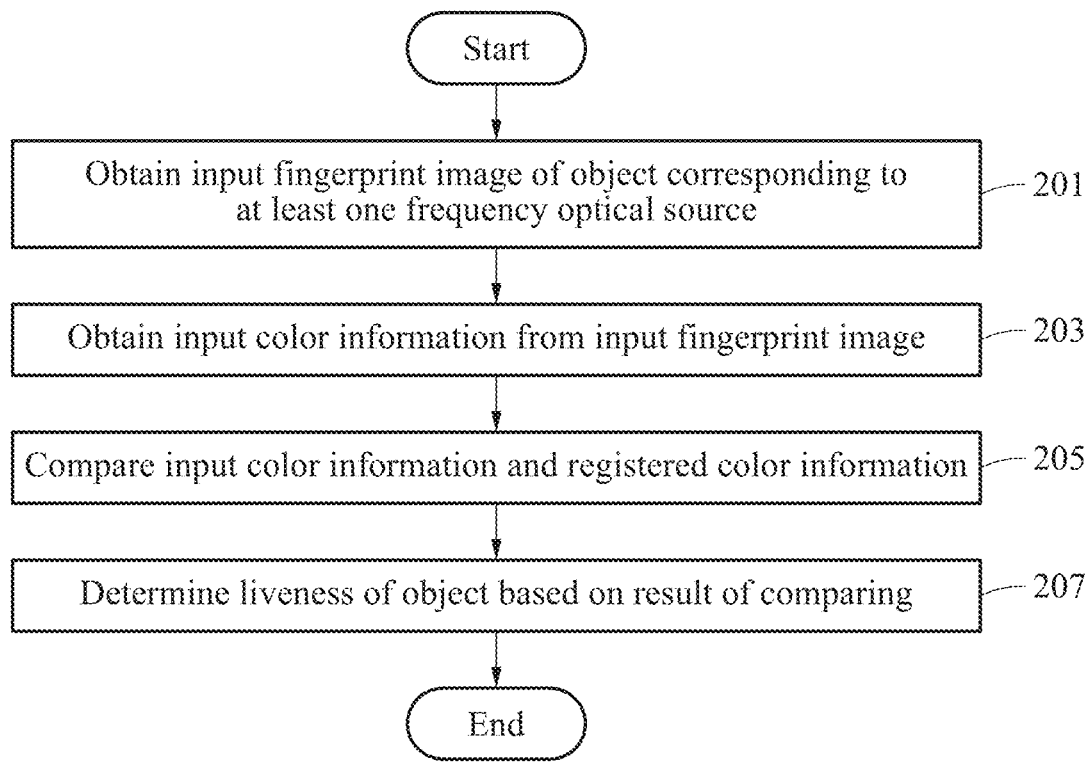
FIG. 2 is a flowchart illustrating an example of a liveness determining method according to an example embodiment.

FIG. 2 is a flowchart illustrating an example of a liveness determining method according to an example embodiment.

Referring to FIG. 2, in operation 201, a liveness determining apparatus obtains, by an optical sensor, an input fingerprint image of an object corresponding to at least one frequency optical source. At least one frequency of the at least one frequency optical source may include, for example, a frequency of red (R), a frequency of green (G), and/or a frequency of blue (B). For example, the liveness determining apparatus may obtain an input fingerprint image of an R optical source, an input fingerprint image of a G optical source, and an input fingerprint image of a B optical source.

For example, the liveness determining apparatus may obtain a plurality of input fingerprint images at a preset frame rate for a preset time period, from each frequency optical source. The liveness determining apparatus may continuously obtain the input fingerprint images at the frame rate for the time period from a point in time at which a finger of a user is detected by an optical sensor. For example, for a single frame, the liveness determining apparatus may obtain continuously input fingerprint images while switching the three R, G, and B optical sources. The liveness determining apparatus may repeat the operation on a plurality of frames for the time period.

In operation 203, the liveness determining apparatus obtains, by a processor, input color information from the input fingerprint image. For example, the liveness determining apparatus may obtain input color information of the R optical source from the input fingerprint image of the R optical source, input color information of the G optical source from the input fingerprint image of the G optical source, and input color information of the B optical source from the input fingerprint image of the B optical source. The liveness determining apparatus may obtain a more accurate image by performing calibration on the input fingerprint image obtained from each optical source. For example, the liveness determining apparatus may perform calibration on the image obtained from the R optical source through a calibration method corresponding to the R optical source, on the image obtained from the G optical source through a calibration method corresponding to the G optical source, and on the image obtained from the B optical source through a calibration method corresponding to the B optical source. The input color information may indicate color information of the input fingerprint image, and registered color information may indicate color information of a registered fingerprint image. The registered fingerprint image may indicate a genuine live fingerprint image of a user that is input in advance.

In operation 205, the processor of the liveness determining apparatus compares the input color information and the registered color information. For example, the liveness determining apparatus may compare the input color information of the R optical source to registered color information of the R optical source, the input color information of the G optical source to registered color information of the G optical source, and the input color information of the B optical source to registered color information of the B optical source. The liveness determining apparatus may compare the input color information and the registered color information by using each of a single frame-based comparison and a multiframe-based comparison, or using them together.

For example, the liveness determining apparatus may compare input color information of a single frame to registered color information for each frequency optical source. In this example, the liveness determining apparatus may compare an input intensity value obtained from the input fingerprint image to a registered intensity, for each frequency optical source. The liveness determining apparatus may determine a difference between the input fingerprint image obtained from each of the RGB optical sources and the registered fingerprint image based a distribution and an average of pixels based on intensities. For example, the liveness determining apparatus may determine whether a difference between an input intensity and a registered intensity for a plurality of pixels is less than a first threshold value. Alternatively, the liveness determining apparatus may determine whether an average of the difference between the input intensity and the registered intensity for the pixels is less than a second threshold value. The input intensity may indicate an intensity of the input fingerprint image, and the registered intensity may indicate an intensity of the registered fingerprint image. In addition, the first threshold value may indicate a criterion for a difference in intensity, and the second threshold value may indicate a criterion for an average of a difference in intensity.

For example, the liveness determining apparatus may compare input color information of multiple frames to registered color information, for each frequency optical source. In this example, the liveness determining apparatus may compare a change in an input intensity of a plurality of input fingerprint images obtained for a preset time period to a change in a registered intensity of a plurality of registered fingerprint images, for each frequency optical source. The liveness determining apparatus may determine whether a difference between the change in the input intensity and the change in the registered intensity is less than a third threshold value, or determine whether a time average of the difference between the change in the input intensity and the change in the registered intensity is less than a fourth threshold value. The third threshold value may indicate a criterion for a difference in a change in an intensity, and the fourth threshold value may indicate a criterion for a time average of a change in an intensity. When corresponding values are less than the third threshold value or the fourth threshold value, the liveness determining apparatus may determine the input fingerprint image to be live, and to be fake otherwise.

In operation 207, the processor of the liveness determining apparatus determines liveness of the object based on a result of the comparing. The object used herein may indicate a target to be sensed by the optical sensor. For example, the object may be a finger of a user, or solids formed of various materials by which a fingerprint is formed to look similar to a genuine live fingerprint. For example, the object may also be a printed object such as, for example, paper.

Figure 3:
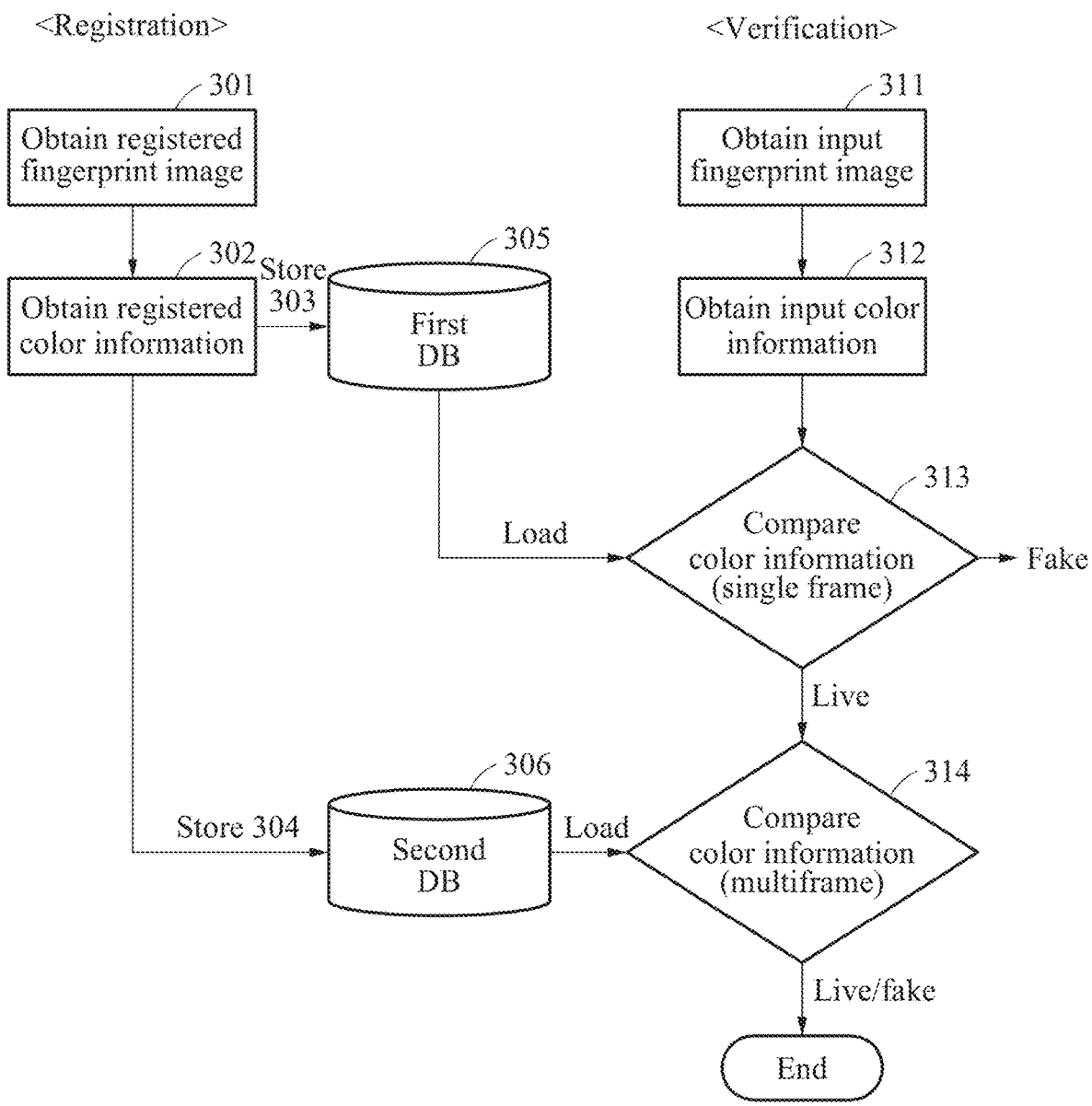
FIG. 3 is a diagram illustrating an example of a registration process and a verification process of a liveness determining apparatus according to an example embodiment.

FIG. 3 is a diagram illustrating an example of a registration process and a verification process of a liveness determining apparatus according to an example embodiment.

According to an example embodiment, a liveness determining apparatus may determine liveness of an object through a registration process and a verification process. The liveness determining apparatus may determine liveness of an object in an input fingerprint image of a user using at least one frequency optical source. The liveness determining apparatus may determine the liveness of the input fingerprint image based on one or more sets of color information. The liveness determining apparatus may determine the liveness of the object in the input fingerprint image, and then verify the user.

Referring to FIG. 3, in operation 301, the liveness determining apparatus obtains a registered fingerprint image. Here, the registered fingerprint image may be a fingerprint to be registered in a registration process. In operation 302, the liveness determining apparatus obtains registered color information. For example, liveness determining apparatus may continuously capture an image of a finger of a user to obtain a registered fingerprint image of N frames, while switching RGB optical sources for a preset time period. The liveness determining apparatus may perform calibration on a registered fingerprint image obtained from each of the optical sources, and calculate a distribution (e.g., $Rn_{var\_E}$, $Gn_{var\_E}$, and $Bn_{var\_E}$ which refer to a variance of the intensity of the registered fingerprint image of each of the optical sources for each of the N frames of the R channel, G channel, and B channel, respectively) and an average (e.g., $Rn_{mean\_E}$, $Gn_{mean\_E}$, and $Bn_{mean\_E}$ which refer to the average intensity of the registered fingerprint image of each of the optical sources for each of the N frames in the R channel, G channel, and B channel, respectively) for pixels based on an intensity of the registered fingerprint image of each of the optical sources for each of the N frames. In addition, the liveness determining apparatus may calculate a change (e.g., $R_{\Delta T\_E}$, $G_{\Delta T\_E}$, and $B_{\Delta T\_E}$) in the pixel distribution and average over a preset time period based on the intensity of the registered fingerprint image.

In operation 303, the liveness determining apparatus stores the registered color information in a first database (DB) 305. The first DB 305 may store therein registered color information of a single frame.

In operation 304, the liveness determining apparatus stores the registered color information in a second DB 306. The second DB 306 may store therein registered color information of multiple frames.

In operation 311, the liveness determining apparatus obtains an input fingerprint image. In operation 312, the liveness determining apparatus obtains input color information. For example, the liveness determining apparatus may continuously capture an image of an object to obtain an input fingerprint image of N frames while switching the RGB optical sources for a preset time period. The liveness determining apparatus may perform calibration on an input fingerprint image obtained from each of the optical sources, and calculate color information (e.g., $Ru_{var\_V}$, $Ru_{mean\_V}$, $GU_{var\_V}$, $GU_{mean\_V}$, $Bu_{var\_V}$, and $Bu_{mean\_V}$) of an input fingerprint image of each of the optical sources for each of the N frames, and a change (e.g., $R_{\Delta T\_E}$, $G_{\Delta T\_E}$, and $B_{\Delta T\_E}$) in a pixel distribution and average obtained over a preset period of time based on an intensity for each of the RGB optical sources.

In operation 313, the liveness determining apparatus compares the color information of the single frame. For example, the liveness determining apparatus may compare the input color information to the registered color information loaded from the first DB 305. When the input fingerprint image is determined to be fake as a result of the comparing, the liveness determining apparatus may determine the object to be fake and then terminate a verification process. In contrast, when the input fingerprint image is determined to be live as the result of the comparing, the liveness determining apparatus may perform operation 314.

In operation 314, the liveness determining apparatus compares the color information of the multiple frames. For example, the liveness determining apparatus may compare the input color information to the registered color information loaded from the second DB 306. The liveness determining apparatus may determine whether the object is fake or live based on whether the input fingerprint image is fake or not.

Figure 4A:
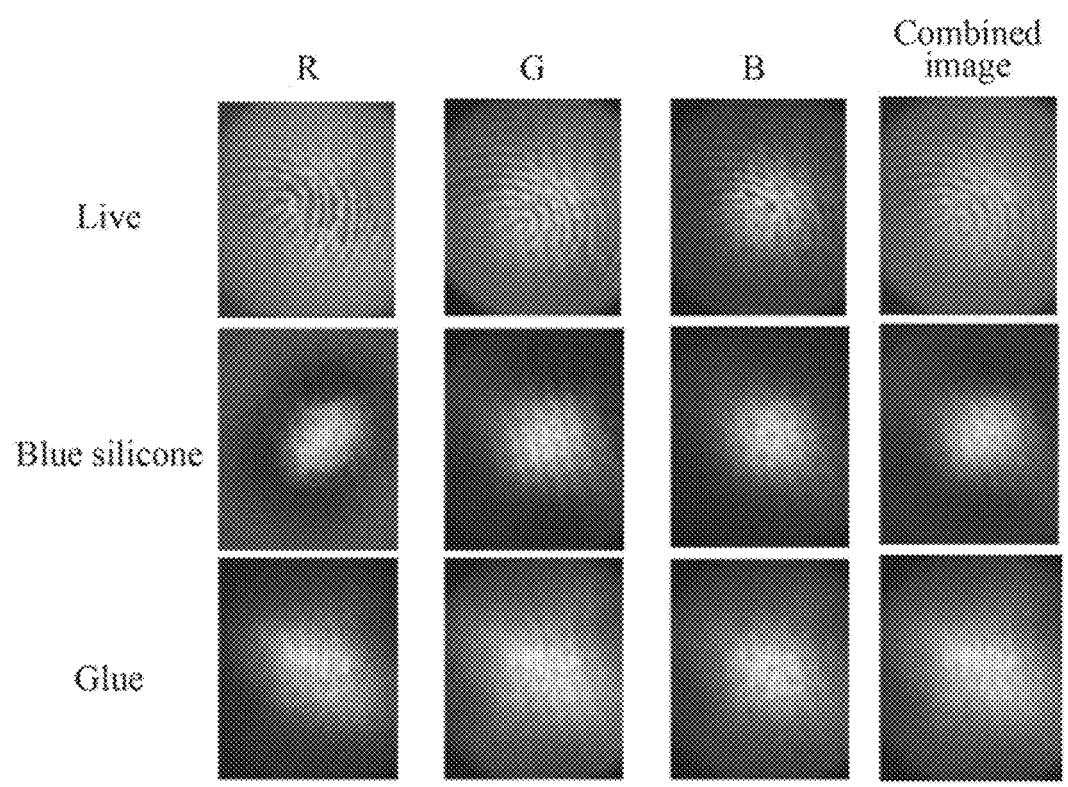
FIG. 4A shows examples of fake fingerprint images formed of various types of materials different from an actual genuine fingerprint image obtained from each of red (R), green (G), and blue (B) optical sources of an optical sensor according to an example embodiment.
Figure 4B:
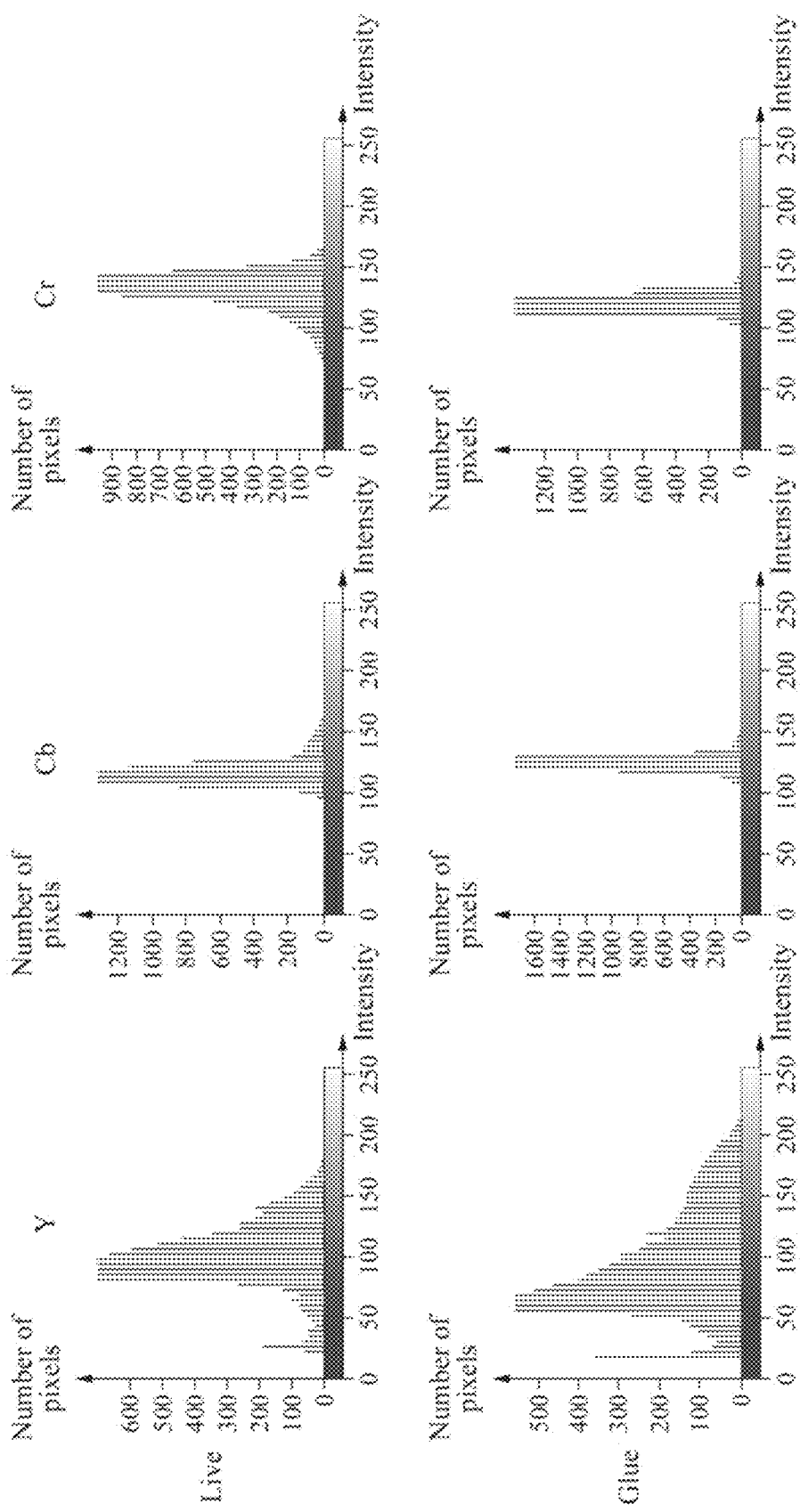
FIG. 4B shows examples of histograms illustrating results of comparisons between actual genuine fingerprint images and fake fingerprint images that are obtained by converting images obtained from each of RGB optical sources of an optical sensor by each YCbCR region according to an example embodiment.

FIG. 4A includes examples of fake fingerprint images formed of various types of materials that are different from an actual genuine fingerprint image obtained from each of RGB optical sources of an optical sensor according to an example embodiment. FIG. 4B includes examples of histograms illustrating results of comparisons between actual genuine fingerprint images and fake fingerprint images that are obtained by converting images obtained from each of RGB optical sources of an optical sensor by each YCbCR region according to an example embodiment.

FIG. 4A illustrates results of calibration performed after objects of three different materials or textures are obtained from each of RGB optical sources by an optical sensor. The first row of images indicates results of calibration performed after an actual live fingerprint of a user is obtained from each of the RGB optical sources. The second row of images indicate results of calibration performed after an object which is formed of blue silicone to look similar to the fingerprint of the user is obtained from each of the RGB optical sources. The third row of images indicates results of calibration performed after an object which is formed of glue to look similar to the fingerprint of the user is obtained from each of the RGB optical sources. The result images obtained by combining the images of each row provide a color of a material used may be reflected in a corresponding combined result image, and thus the combined result images may have different colors (not shown in grayscale FIG. 4A). Based on this, it may be verified that the actual live fingerprint of the user and fake fingerprints are different from each other in terms of color information.

FIG. 4B illustrates results indicated by histograms of intensities of respective channels that are obtained by converting the results of FIG. 4A by a YCbCr color model. Referring to FIG. 4B, it may be verified that there is a difference in pixel distribution in respective channels based on each material used or texture.

Figure 5:
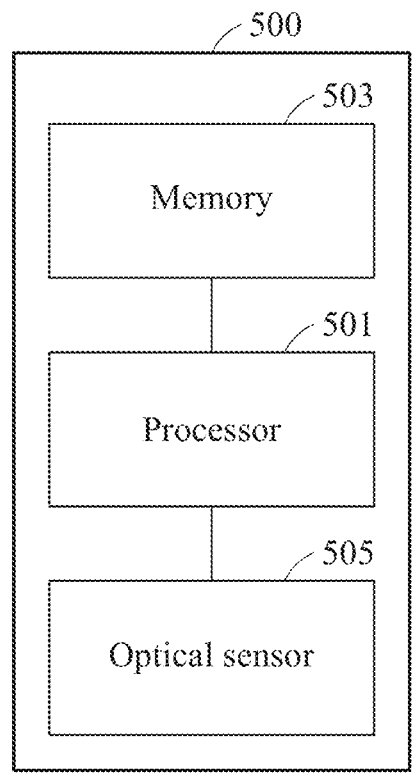
FIG. 5 is a diagram illustrating an example of a liveness determining apparatus according to an example embodiment.

FIG. 5 is a diagram illustrating an example of a liveness determining apparatus according to an example embodiment.

Referring to FIG. 5, a liveness determining apparatus 500 includes at least one processor 501, a memory 503, and an optical sensor 505. The memory 503 may store therein registered color information.

The processor 501 may obtain an input fingerprint image of an object corresponding to at least one frequency optical source of the optical sensor 505.

The processor 501 may obtain input color information from the input fingerprint image. For example, the processor 501 may obtain an input fingerprint image of an R optical source, an input fingerprint image of a G optical source, and an input fingerprint image of a B optical source. The processor 501 may obtain a plurality of input fingerprint images at a preset frame rate for a preset time interval, for each frequency optical source.

The processor 501 may compare the input color information and the registered color information. For example, the processor 501 may compare input color information of a single frame and the registered color information, for each frequency optical source. The processor 501 may compare an input intensity obtained from the input fingerprint image and a registered intensity, for each frequency optical source.

For another example, the processor 501 may compare input color information of multiple frames and the registered color information, for each frequency optical source. The processor 501 may compare a change in an input intensity of a plurality of input fingerprint images obtained for a preset time period and a change in a registered intensity of a plurality of registered fingerprint images, for each frequency optical source.

The processor 501 may determine liveness of the object based on a result of the comparing. For example, the processor 501 may determine the liveness of the object based on a result of such single frame-based comparison or a result of such multiframe-based comparison. The processor 501 may determine the liveness of the object based on the result of the single frame-based comparison and the result of the multiframe-based comparison. For example, when the result of the single frame-based comparison or the result of the multiframe-based comparison indicates that the input fingerprint image is fake, the processor 501 may determine the object to be fake.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

While this disclosure includes specific examples, it will be apparent to one of ordinary skill in the art that various changes in form and details may be made in these examples without departing from the scope of the claims and their equivalents.

What is claimed is:

1. A liveness determining method comprising:
   obtaining, by a processor, registered color information corresponding to a user;
   obtaining, by an optical sensor, an input fingerprint image of the user corresponding to at least one optical source of the optical sensor;

obtaining, by the processor, input color information from the input fingerprint image, the input color information comprising an input intensity;

comparing, by the processor, the input color information and the registered color information, the registered color information comprising a registered intensity; and determining, by the processor, liveness of the user based on a result of the comparing, wherein the comparing comprises:

comparing a change in the input intensity of a plurality of input fingerprint images obtained for a preset time period and a change in the registered intensity of a plurality of registered fingerprint images, for each optical source of a plurality of optical sources having different frequencies; and determining whether a time average of a difference between the change in the input intensity of the plurality of input fingerprint images and the change in the registered intensity of the plurality of registered fingerprint images is less than a first threshold value.

2. The liveness determining method of claim 1, wherein the obtaining of the input fingerprint image comprises obtaining the plurality of input fingerprint images at a preset frame rate for the preset time period, for each optical source of the plurality of optical sources having different frequencies.

3. The liveness determining method of claim 1, wherein the comparing further comprises:

determining whether an average of a difference between the input intensity and the registered intensity for a plurality of pixels in each input fingerprint image of the plurality of input fingerprint images is less than a second threshold value.

4. The liveness determining method of claim 1, wherein the at least one optical source has at least one of a frequency of red (R), a frequency of green (G), and a frequency of blue (B).

5. The liveness determining method of claim 4, wherein the obtaining of the input fingerprint image comprises obtaining an input fingerprint image corresponding to an R optical source, an input fingerprint image corresponding to a G optical source, and an input fingerprint image corresponding to a B optical source, wherein the obtaining of the input color information comprises:

obtaining input color information of the R optical source from the input fingerprint image corresponding to the R optical source;

obtaining input color information of the G optical source from the input fingerprint image corresponding to the G optical source; and obtaining input color information of the B optical source from the input fingerprint image corresponding to the B optical source, wherein the comparing comprises:

comparing the input color information of the R optical source and registered color information of the R optical source;

comparing the input color information of the G optical source and registered color information of the G optical source; and comparing the input color information of the B optical source and registered color information of the B optical source, and wherein the determining comprises determining the liveness of the user based on results of the comparing.

6. A non-transitory computer-readable storage medium storing instructions that are executable by a processor to perform the liveness determining method of claim 1.

7. The liveness determining method of claim 1, wherein the comparing further comprises determining whether a difference between the input intensity and the registered intensity for a plurality of pixels in each input fingerprint image of the plurality of input fingerprint images is less than a second threshold value.

8. A liveness determining apparatus comprising:

an optical sensor including at least one optical source;

a memory configured to store registered color information comprising a registered intensity, the registered color information corresponding to a user; and at least one processor configured to:

obtain, from the optical sensor, an input fingerprint image of the user corresponding to the at least one optical source, obtain input color information from the input fingerprint image, the input color information comprising input intensity, compare the input color information and the registered color information, and determine liveness of the user based on a result of the comparing, wherein the at least one processor is further configured to:

compare a change in the input intensity of a plurality of input fingerprint images obtained for a preset time period and a change in the registered intensity of a plurality of registered fingerprint images, for each optical source of a plurality of optical sources having different frequencies; and determine whether a time average of a difference between the change in the input intensity of the plurality of input fingerprint images and the change in the registered intensity of the plurality of registered fingerprint images is less than a first threshold value.

9. The liveness determining apparatus of claim 8, wherein the at least one optical source includes the plurality of optical sources having different frequencies, and wherein the at least one processor is further configured to obtain the plurality of input fingerprint images at a preset frame rate for the preset time period, for each optical source of the plurality of optical sources having different frequencies.

10. The liveness determining apparatus of claim 8, wherein the at least one optical source includes the plurality of optical sources having different frequencies, and wherein the at least one processor is further configured to compare the input intensity obtained from the input fingerprint image and the registered intensity, for each optical source of the plurality of optical sources having different frequencies.

11. The liveness determining apparatus of claim 10, wherein the at least one processor is further configured to:

determine whether an average of the difference between the input intensity and the registered intensity for a plurality of pixels in each input fingerprint image of the plurality of input fingerprint images is less than a second threshold value.

12. The liveness determining apparatus of claim 8, wherein the at least one optical source has at least one of a frequency of red (R), a frequency of green (G), and a frequency of blue (B).

13. The liveness determining apparatus of claim 12, wherein the at least one optical source includes an R optical source, a G optical source, and a B optical source, and wherein the at least one processor is further configured to:
obtain an input fingerprint image corresponding to the R optical source, an input fingerprint image corresponding to the G optical source, and an input fingerprint image corresponding to the B optical source,
obtain input color information of the R optical source from the input fingerprint image corresponding to the R optical source,
obtain input color information of the G optical source from the input fingerprint image corresponding to the G optical source,
obtain input color information of the B optical source from the input fingerprint image corresponding to the B optical source,
compare the input color information of the R optical source and registered color information of the R optical source,
compare the input color information of the G optical source and registered color information of the G optical source,
compare the input color information of the B optical source and registered color information of the B optical source, and
determine the liveness of the user based on results of the comparing.

14. The liveness determining apparatus of claim 8, wherein the at least one processor is further configured to determine whether a difference between the input intensity and the registered intensity for a plurality of pixels in each input fingerprint image of the plurality of input fingerprint images is less than a second threshold value.

\* \* \* \* \*